United States Patent [19]

Allori et al.

[11] 4,374,375
[45] Feb. 15, 1983

[54] PROBE MOUNT ASSEMBLY FOR BRAKE WEAR WARNING SYSTEMS

[75] Inventors: Aldo Allori, Brookfield; Ronald A. Koutsky, Lombard; John A. Wilger, Chicago, all of Ill.

[73] Assignee: International Harvester Co., Chicago, Ill.

[21] Appl. No.: 253,621

[22] Filed: Apr. 13, 1981

[51] Int. Cl.³ ...................... B60R 25/10; G08B 21/00
[52] U.S. Cl. .................. 340/52 A; 188/1.11; 200/61.4
[58] Field of Search ............. 340/52 A; 200/61.4; 188/1.11

[56] References Cited

U.S. PATENT DOCUMENTS

| | | | |
|---|---|---|---|
| 2,146,357 | 2/1939 | Schweikle | 340/52 A X |
| 2,731,619 | 1/1956 | Fratus | 340/52 A |
| 2,814,684 | 11/1957 | De Pascale | 340/52 A |
| 2,835,757 | 5/1958 | Chellemi et al. | 200/61.4 |
| 3,018,852 | 1/1962 | Stanton | 188/72 |
| 3,297,985 | 1/1967 | Trebonsky et al. | 340/69 |
| 3,321,045 | 5/1967 | Veilleux | 188/1 |
| 3,363,232 | 1/1968 | Mizsak | 340/52 |
| 3,398,246 | 8/1968 | Linet | 200/61.4 |
| 3,604,865 | 3/1971 | Bricker | 200/61.4 |
| 3,605,085 | 5/1967 | Florita et al. | 340/52 A |
| 3,660,815 | 5/1972 | Rees | 340/52 A |
| 3,689,880 | 9/1972 | McKee et al. | 340/52 A |
| 3,713,091 | 1/1973 | Kobayashi et al. | 340/52 A |
| 3,716,113 | 10/1970 | Kobayashi | 188/1 A |
| 3,716,832 | 2/1973 | Gorgie et al. | 340/52 A |
| 3,735,343 | 5/1973 | Lane et al. | 340/52 A |
| 3,882,448 | 5/1975 | Shibatani et al. | 200/61.4 X |
| 4,186,822 | 2/1980 | Khuntia et al. | 188/1.11 |
| 4,188,613 | 2/1980 | Yang et al. | 340/52 A |
| 4,241,603 | 12/1980 | Han et al. | 188/1.11 X |

FOREIGN PATENT DOCUMENTS 2122717 6/1970 Fed. Rep. of Germany.

Primary Examiner—John W. Caldwell, Sr.
Assistant Examiner—Joseph E. Nowicki
Attorney, Agent, or Firm—Boris Parad; F. David AuBuchon

[57] ABSTRACT

A probe mount assembly for a brake wear warning system comprising a probe electrically connected with a warning signal electric circuit and supported by and electrically insulated from one of friction plates by a nonrotatable bushing and a spacer disposed on the opposite sides of said one friction plate.

9 Claims, 2 Drawing Figures

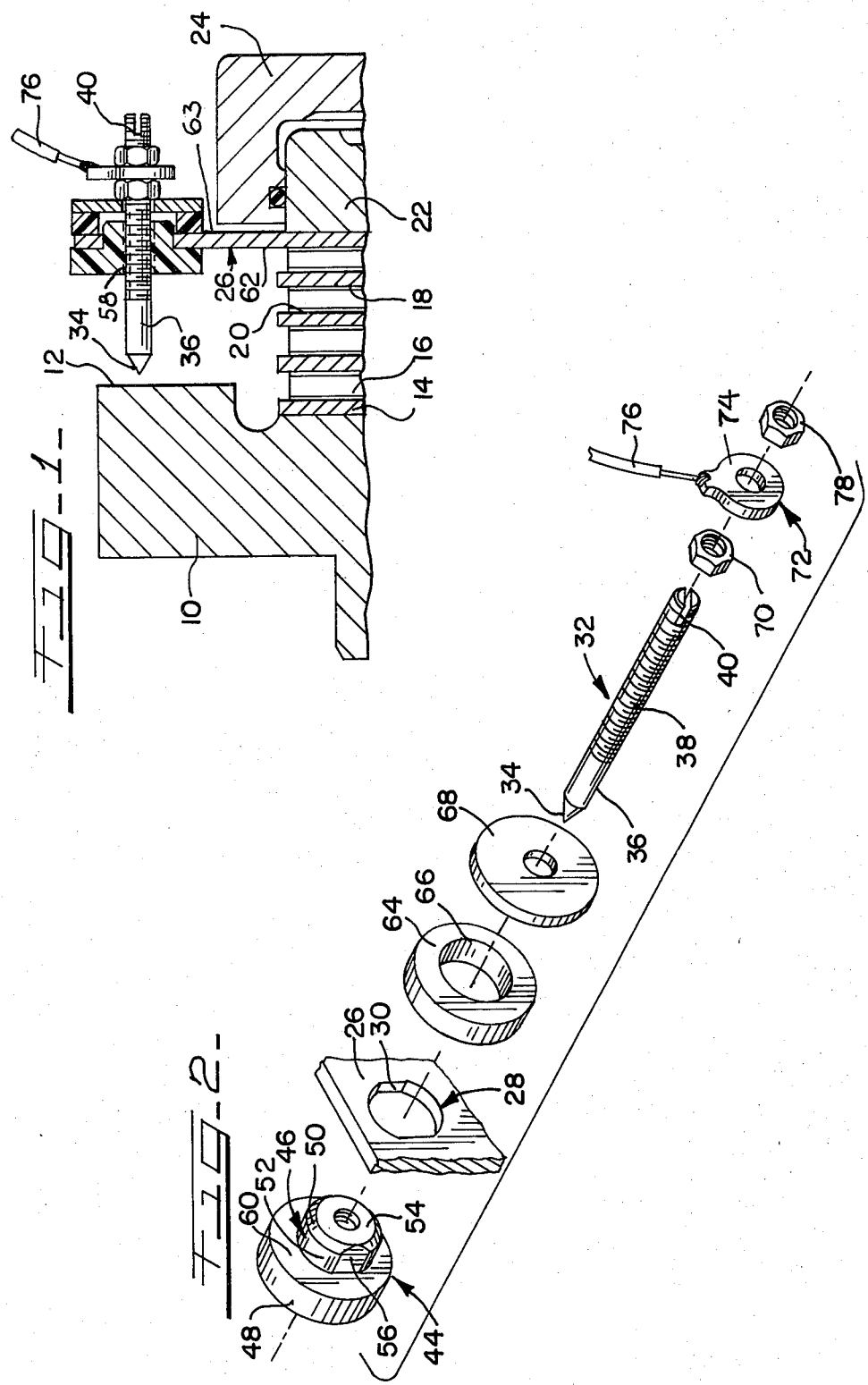

PROBE MOUNT ASSEMBLY FOR BRAKE WEAR WARNING SYSTEMS

BACKGROUND OF THE INVENTION

1. Field of the Invention

This invention pertains to brake wear warning systems and more particularly to a contact probe mount arrangement for such warning systems.

2. Description of the Prior Art

Heretofore, numerous wear indicating devices have been advanced to provide an indication of wear of the brake lining strip and friction pads in disc brakes to determine the replacement point. These devices have employed various probe mount arrangements therefor. For example, U.S. Pat. No. 3,321,045, discloses brake lining sensing device carried by a brake shoe and being partially recessed into the brake shoe lining. U.S. Pat. No. 3,605,085, discloses brake lining wear detection means including limit switch means in the detection circuit. U.S. Pat. No. 3,716,113, provides a warning device for indicating wear of friction pads in disk brakes having a detecting switch device operating to open the detection circuit and a warning circuit operating in response to the opening of the detection circuit to produce a warning. German OS patent application No. 2,122,717, discloses a warning system for worn brake-block (friction bodies) on disk brakes employing an electrode holding arrangement.

However, none of the prior art references of record discloses such a novel arrangement of a probe mount assembly in a brake wear warning system as disclosed in the subject invention.

SUMMARY OF THE INVENTION

A brake wear warning system is mounted on a brake housing. A hydraulically actuated brake piston, which moves in a piston housing, compresses a set of alternatively spaced and juxtaposed stationary friction plates and rotatable brake discs thereby restricting the rotational motion of the discs. One of the friction plates has a tab for supporting a probe, which is electrically connected to a warning signal at an operator's station. This probe contacts the grounded brake housing with its tip at a predetermined plate wear limit, thereby completing an electric circuit and thus actuating the warning signal. Bushing means removably mounted on the probe and electrically insulated therefrom hold the probe within the aperture in the tab on one side thereof. A spacer electrically insulating the probe from the tab is adjacent and attached to another side of the tab by locking means. An electrical connector terminal is releasably mounted on and electrically connecting the probe with the warning signal circuit.

This invention will become apparent to those having ordinary skill in the art by reference to the following description, drawings and appended claims.

BRIEF DESCRIPTION OF THE DRAWINGS

FIG. 1 is a side elevational view of a probe mount assembly.

FIG. 2 is an exploded perspective view of the probe mount assembly.

DESCRIPTION OF THE PREFERRED EMBODIMENT

Referring now to the drawings wherein reference characters designate like or corresponding parts throughout the several views, there shown in FIG. 1 a grounded brake housing 10 having a contact surface 12 and containing a set of friction or separator plates 14 being alternatively spaced with rotating brake discs 16. Each of the friction plates 14 has at least one side 18 engaging the corresponding side 20 of the discs 16 in a friction producing manner when a hydraulically actuated piston 22, movable within a piston housing 24, compresses discs 16 against friction plates 14. The piston housing 24 is rendered leak proof by virtue of O-ring seal 26. The disc brakes 16 are driven by spline extension of the output shaft which is not shown in FIG. 1, but is well known in the art. The compression of brake discs 16 against the friction plates 14 brakes the rotational motion of said discs 16.

One of the friction plates 14 has a tab portion 26 including an aperture 28, as best shown in FIG. 2. The aperture 28 has a round configuration with two flattened and diametrically opposed sides 30.

A contact probe 32 comprises a tip 34 at one end of a stem 36. The stem 36 has a threaded portion 38 and a recess or slot 40 at its other end or butt 42. A bushing 44 has a T-shape configuration with a locking cylinder portion 46 extending from a coaxial cylinder collar portion 48 of a significantly larger diameter than the locking cylinder 46. The cylinder 46 has a bevel edge 50, outer wall 52 and front surface 54. The outer wall 52 is truncated by two parallel planes forming two flattened surfaces or sides 56 matching the aperture flattened sides 30. The bushing 44 includes a threaded bore 58 engageable with the probe threaded portion 38. The bushing 44 is made out of heat resistant material such as black phenolic or any other suitable material. The collar 48 has a contact surface 60 contiguously abutting an inner side or surface 62 of the tab 26, which also has outer surface or side 63, when the bushing 44 is inserted in the aperture 28.

A cylinder-shaped spacer 64 comprises a central bore 66 having a diameter larger than that of the cylinder 46 passing therethrough. The spacer 64, which is made from a heat resistant material, such as black phenolic or other suitable material, is mounted on the cylinder 46 in a sandwich-like relation between the tab outer surface 63 and a washer 68. A locking nut 70 is threadably engaged with the probe threaded portion 38.

An electrical connector terminal 72 has a clevis portion 74 slidably attachable to the probe 32 and soldered to a wire 76 connecting it with the warning signal, such as lights or sounds. A nut 78 connects the terminal 72 to the locking nut 70.

In operation, a bushing 44 threadably engaged with a probe is placed into a tab aperture 28 with a probe tip 34 facing the housing contact surface 12. A locking cylinder 46 is projected through the aperture 28. The bushing collar 48 is firmly pressed against the inner surface 62 of the tab 26 so that the locking cylinder flattened sides 56 being in registry with the matching aperture sides 30 prevent the bushing 44 from rotation within the aperture 28. A spacer 64, which is slidably mounted on the cylinder 46, abuts the tab outer surface 63. Both the bushing 44 and spacer 64 electrically insulate the probe 32 from the tab 26. Washer 68 slidably mounted on the probe is positioned between the spacer 64 and a locking nut 70. An electrical connector terminal 74 hooked on a probe threaded portion 38 is attached to the locking nut 70 by a nut 78. A recess 40 in the stem butt 42 is adapted to receive an associate instrument, such as a screwdriver or other suitable mechanical means, to turn the probe within the aperture, thereby adjusting the distance between the probe tip 34 and a contact surface 12 of the brake housing 10. When the friction plates 14 are worn to a predetermined limit, the probe tip 34 will contact the brake housing surface 12 thereby completing the electric circuit and thus lighting a warning signal light at an operator's station. The probe mount assembly lends itself to a facile fabrication, installation and convenient adjustment of an axial displacement position of the contact probe being supported by and electrically insulated from the friction plate tab.

The foregoing description and drawings expressed and illustrated in the invention and the invention is not limited thereto except insofar as the appended claims are so limited, as those skilled in the art who have the disclosure before them will be able to make modifications and variations therein without departing from the scope of the invention.

What is claimed is:

1. A probe mount assembly for supporting an adjustable contact probe of a pre-selected extension engageable with a ground member at a predetermined time to complete a warning signal electric circuit, the assembly comprising:
    a tab plate supporting the assembly and movable with regard to said ground member;
    said tab plate having an aperture;
    said tab plate having inner and outer sides and said inner side facing the ground member;
    bushing means threadably engageable with and holding said probe within said aperture and contiguous with said inner side;
    a spacer slidably mounted on said bushing means and contiguous with said outer side;
    said bushing means and said spacer electrically insulating said probe from said tab plate;
    an electrical connector terminal detachably mounted on said probe and connected to said warning signal electrical circuit; and
    locking means removably mounted on said probe for securing said assembly to said tab plate and facilitating an axial displacement of said probe;
    said ground member being a disc brake housing, containing a set of frictionally engageable and alternatively spaced discs and friction plates;
    said discs attached to and rotatable by a shaft;
    said set being compressible by an associated brake piston to brake the rotational movement of said discs against said friction plates;
    said probe being of a unitary construction and extending substantially outwardly from said bushing means and toward said ground member.

2. The assembly in accordance with claim 1, and said bushing means comprising a T-shaped bushing having a locking cylinder coaxially extending from a collar cylinder of a significantly larger diameter than said locking cylinder.

3. The assembly in accordance with claim 1, and said tab plate being a part of one of said friction plates; and
    said probe contacting said brake housing at a preselected plate wear limit.

4. The assembly in accordance with claim 2, and said locking cylinder having peripherally truncated portions thereby forming flattened cylinder sides; and
    said aperture having a configuration matching the same of said locking cylinder.

5. The assembly in accordance with claim 1, and said locking means comprising a washer and nuts threadably engageable with said probe;
    said bushing means having means for preventing the rotational motion thereof within said aperture;
    said spacer being removably mounted on said bushing means and contiguous with the outer side of said tab plate.

6. The invention in accordance with claim 1, and said probe having a cylindrical body with a threaded portion being engageable with said bushing means and said locking means; and
    said probe having a recess adapted to receive an associate instrument to provide the rotational motion to said probe.

7. The assembly in accordance with claim 1, and, said bushing means comprising a bushing having a locking cylinder with an axial bore;
    said probe being threadably engageable with said bushing and movable through said bore;
    said locking cylinder having its outer wall flattened at diametrically opposed sides for complementary engagement with said tab plate within said aperture.

8. The assembly in accordance with claim 1, and said locking means comprising a washer slidably mounted on said probe and contiguous with said spacer;
    a locking nut threadably engageable with said probe and pressing said washer against said spacer and
    a nut threadably engageable with said probe and securing said electrical terminal to said locking nut;
    said electrical connector terminal comprising an element encompassing said probe and connected to an electrical conduit leading to said signal circuit.

9. In a brake wear warning system with a brake housing, a set of alternatively spaced and juxtaposed stationary friction plates and rotatable brake discs compressible by a brake piston to restrict the rotational motion of the discs, one of the friction plates having a tab portion for supporting an adjustable contact probe of a pre-selected extension electrically connected with a warning signal electrical circuit being completed by a contact of a probe tip with the brake housing at a predetermined plate wear limit, and a probe mount assembly comprising;
    said tab portion having inner and outer sides and said inner side facing said housing;
    said tab portion having an aperture;
    bushing means removably and lockingly holding said probe within said aperture;
    said bushing means projecting through said aperture from said inner side to said outer side;
    a spacer slidably mounted on said bushing means and contiguous with said outer side of said tab portion;
    said bushing means and spacer means electrically insulating said tab portion from said probe;
    locking means removably mounted on said probe for rigid connection thereof with said tab portion;
    electrical connector terminal means releasably mounted on and lockingly attached to said probe for connecting said probe with said electric circuit;
    said probe having a cylindrical body with a threaded portion being engageable with said bushing means and said locking means;

said probe having a recess adapted to receive an associate instrument to provide the rotational motion to said probe;
said bushing means comprising a bushing having a locking cylinder with an axial bore;

said probe being threadably engageable with said bushing and movable through said bore;
said locking cylinder having its outer wall flattened at diametrically opposed sides for complementary engagement with said tab plate within said aperture.

* * * * *